(12) United States Patent
Achten et al.

(10) Patent No.: US 7,071,292 B2
(45) Date of Patent: Jul. 4, 2006

(54) METHOD FOR THE PREPARATION OF PURIFIED ELASTOMERS FROM SOLUTION

(75) Inventors: Dirk Achten, Köln (DE); Rafael Warsitz, Essen (DE); Gregor Dudziak, Bonn (DE); Franz-Josef Mersmann, Bergisch Gladbach (DE); Stephen Pask, Dormagen (DE); Zsolt Szentivanyi, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/962,801

(22) Filed: Oct. 12, 2004

(65) Prior Publication Data

US 2005/0197486 A1    Sep. 8, 2005

(30) Foreign Application Priority Data

Oct. 14, 2003 (DE) ................................ 103 47 704

(51) Int. Cl.
*C08F 6/06* (2006.01)
(52) U.S. Cl. .................................. 528/491; 528/502 A
(58) Field of Classification Search ............ 528/502 A, 528/491
See application file for complete search history.

(56) References Cited

U.S. PATENT DOCUMENTS

| | | | | |
|---|---|---|---|---|
| 4,082,659 | A | * | 4/1978 | Heinze et al. .............. 210/636 |
| 4,271,055 | A |   | 6/1981 | Daniel et al. ......... 260/29.6 TA |
| 4,294,704 | A |   | 10/1981 | Daniel et al. .............. 210/651 |
| 4,369,266 | A | * | 1/1983 | Kuhls et al. ................ 523/332 |
| 6,703,461 | B1 |  | 3/2004 | Tanaka et al. .............. 526/242 |
| 2004/0147698 | A1 |  | 7/2004 | Tanaka et al. .............. 526/247 |

OTHER PUBLICATIONS

Morton, "Elastomers, Synthetic, Survey", Kirk-Othmer Encyclopedia of Chemical Technology, J. Wiley & Sons, Inc., DOI:10.1002/04712389621. Article Online Posting Date: Dec. 4, 2000.*

* cited by examiner

*Primary Examiner*—Fred Teskin
(74) *Attorney, Agent, or Firm*—Jennifer R. Seng

(57) ABSTRACT

The present invention relates to a method for the preparation of purified elastomers prepared by emulsion polymerization, wherein the level of impurity is reduced by up to 99 wt. %, expressed in terms of the unpurified elastomer. The present invention also relates to elastomers which can be obtained by the method according to the present invention, to the use of the elastomers for the production of all types of products, and to the product which is produced by processing the elastomer which can be obtained by the method according to the present invention.

9 Claims, No Drawings

METHOD FOR THE PREPARATION OF PURIFIED ELASTOMERS FROM SOLUTION

FIELD OF THE INVENTION

The present invention relates to a method for the preparation of purified elastomers prepared by emulsion polymerization, having a reduced level of impurities by up to 99 wt. %, expressed in terms of the unpurified elastomer, to elastomers which can be obtained by the method according to the present invention, to the use of the elastomers for the production of all types of products, and to the product which is produced by processing the elastomer which can be obtained by the method according to the present invention.

BACKGROUND OF THE INVENTION

There is a great need for a method which makes it possible to prepare elastomers whose level of impurities is so low, or can be influenced in a controlled way, that these impurities no longer have any effect on subsequent reactions and allow the elastomers to be used in the fields of medicine and contact with food.

Elastomers are widely used in many rubber-technology products, such as rubber tubing, transmission belts, seals, membranes, fabric coverings, shoe soles, profile sections, films, packaging materials and many other products. For applications in the field of injection-molded articles, applications involving contact with food, in the field of medicine, in the electronics industry and as starting products for further reactions, such as hydrogenations in the presence of sensitive transition metal catalysts, the elastomers need to have the impurities due to the elastomer production process, namely radical polymerization in an aqueous emulsion, removed from them in an elaborate way. The use of elastomers with too high an impurity level is therefore often greatly restricted on toxicological grounds in the medical sector and for contact with food, the limit on the impurity level being dependent both on the type of impurity and on its concentration. Impurity levels which are less than 2 wt. %, however, are preferred. The use of elastomers with too high an impurity level in electronic applications is often only conditionally possible. This is true especially when the impurities contain water and/or ions, since these can greatly affect the corrosion behavior and conductivity behavior of the electronic products, and they cannot always be removed by the action of heat without leaving a residue. Elastomers with an impurity level of more than 4 wt. %, expressed in terms of the purified elastomer, often cannot be used for reactions such as metatheses and/or hydrogenations, in which it is necessary to operate in the presence of sensitive transition metal catalysts, since the impurities make the reaction control more difficult, lengthen the reaction times and reduce the efficiency of the transition metal catalyst. In the case of hydrogenation, the impurities can furthermore contribute very significantly to corrosion and therefore wear of the systems needed for the hydrogenation. For many applications such as injection-molded articles or extruded articles, the use of elastomers with too high an impurity level (more than 3 wt. %) can lead to reduced surface quality of the articles, for instance mold contamination or efflorescence. Recovery of the impurities remaining in the elastomer is often of economic interest. This is true, in particular, when having used expensive catalysts which can be recycled after catalytic processing.

For the applications mentioned above, the purification of the elastomers with respect to impurities is typically carried out by expensive neutralization, coagulation, precipitation and washing processes in suitable organic substances, such as alcohols, ketones, ethers, water and mixtures thereof (Ullmann's Encyclopedia of Industrial Chemistry, Sixth Edition, 2000 Electronic Release), although complete purification cannot in principle be guaranteed. A particular problem involves the separation of low-molecular, sometimes high-boiling (>150° C.), weakly water-soluble and/or water-insoluble impurities such as emulsifiers, fatty acids, fatty acid salts and fatty acid esters, monomers and derivatives thereof, such as dimers, oligomers, undesired reaction products with starters and modifiers, modifiers/derivatives, organic catalyst residues and ligands, which remain in the elastomer phase when the elastomers have been prepared by emulsion polymerization and conventional purification processes. Using the processing and purification methods known in the prior art, these impurities often cannot be separated sufficiently, and even then only with significant economic outlay, since they become encapsulated during the latex coagulation of the elastomer and are therefore inaccessible to the washing processes. Fractional precipitation of the elastomers from solution, in order to separate low-molecular impurities and/or impurities soluble in organic solvents (precipitating agents) in which the polymer is insoluble, for example methanol as a solvent in the case of nitrile butadiene rubber and polychloroprene rubber, such impurities being for example emulsifiers, fatty acids, fatty acid esters, fatty acid salts of Na/K/Ca, monomers, modifiers, catalyst components, reaction products thereof, and subsequent drying, is known but entails high costs on the industrial scale. It is furthermore ecologically disadvantageous owing to the large amounts of solvents and precipitating agents required. It is therefore the object of the present invention to provide a method which makes it possible to reduce the impurity level of elastomers by up to 99 wt. % in relation to the unpurified elastomers.

SUMMARY OF THE INVENTION

The present invention relates to a method for the preparation of purified elastomers, which are prepared by emulsion polymerization and whose level of impurities is reduced by up to 99 wt. %, expressed in terms of the unpurified elastomer, including the steps of
 a) ultrafiltering an unpurified elastomer, prepared by emulsion polymerization, in an organic solvent and separately collecting the permeate, which contains the impurities, from the retentate which contains the purified elastomer, and
 b) adjusting the flow rate of the retentate to a value of more than 1 m/sec during the ultrafiltration.

In the method according to the present invention, it is preferably for the unpurified elastomer to be nitrile butadiene rubber, which is prepared by emulsion polymerization, converted into a solid rubber and subsequently dissolved in an organic solvent.

The method according to the present invention is more preferably for unpurified hydrogenated nitrile butadiene rubber as the elastomer, which is prepared by hydrogenation of nitrile butadiene rubber that has an impurity level in the range of from 1 to 10 wt. % in the presence of a transition metal catalyst, the transition metal catalyst being recovered from the permeate of the ultrafiltration and reused in the hydrogenation after processing.

In the method according to the present invention, it is preferably for a nitrile butadiene rubber already prepared by the method according to the invention to be hydrogenated in the presence of a transition metal catalyst to form the unpurified hydrogenated nitrile butadiene rubber, a) the unpurified hydrogenated solution which is obtained being ultrafiltered, the permeate which contains the transition metal catalyst being collected separately from the retentate, which contains the purified hydrogenated nitrile butadiene rubber, and b) the flow rate of the retentate is adjusted to a value of more than 1 m/sec during the ultrafiltration, the transition metal catalyst being recovered from the permeate of the ultrafiltration and reused in the hydrogenation after processing.

The ultrafiltration is preferably performed continuously in the method according to the present invention.

In the method according to the present invention, it is preferable for the ultrafiltration to be carried out at temperatures in the range of from 20° C. to 150° C. and at a pressure in the range of from 1 to 80 bar.

In the method according to the present invention, it is preferable for the membrane used in the ultrafiltration to have an exclusion limit of less than 200 nm, more preferably less than 50 nm.

The present invention also relates to the purified elastomer which can be obtained by the method according to the present invention.

The present invention also relates to the use of the elastomer purified by the method according to the present invention for the production of all types of products.

The present invention also relates to the product which can be obtained by processing the purified elastomer, which is prepared by the method according to the present invention.

DETAILED DESCRIPTION OF THE INVENTION

By the method according to the present invention, purified elastomers with an impurity level reduced by up to 99 wt. % can be prepared from unpurified elastomers. The term "unpurified elastomers" is in this case intended to mean elastomers which have an impurity level of more than 1 wt. %, expressed in terms of the unpurified elastomer. The term "purified elastomers" is intended to mean all elastomers whose impurity level has been reduced by up to 99 wt. %, and in any event at least 50 wt. %, expressed in terms of the unpurified elastomer. Purified elastomers with an impurity level in the range of from 0.05 to 1 wt. %, expressed in terms of the total weight of the purified elastomer, are preferred.

The term "impurities" is in this case intended to mean all monomers, additives and/or reaction products thereof known to the person skilled in the art, which may be unreacted, added and/or produced during the preparation of an elastomer. The impurities are preferably selected from the group consisting of emulsifiers, organic and/or inorganic salts or acids such as fatty acids and resins, water, unreacted initiator residues and/or decomposition products, stabilizers, molecular weight regulators, monomers, processing agents such as flocculants, oligomeric components with a molecular weight of less than 2000 g/mol and transition metal catalysts for the hydrogenation or metathesis, oxidizing and/or reducing agents and/or components of these transition metal catalysts, oxidizing and/or reducing agents preferred impurities are fatty acids, fatty acid esters and Na, K, Ca salts of fatty acids, or resin acids, stabilizers, flocculants, water, catalyst components, and ligands.

Often, it is not possible to recover the transition metal catalyst with its structure originally used in the catalysis, but instead only components of the previously used transition metal catalyst. The term "components of the previously used transition metal catalyst" is intended to mean all ligands, transition metals, transition metal compounds and ligand derivatives which have been formed during the homogeneous catalysis.

For the method according to the present invention, an organic solution of the contaminated elastomer must be available. As the organic solvents in the method according to the present invention, it is possible to use all organic solvents and/or solvent mixtures in which the polymer is homogeneously dissolved at >90 wt. % under the processing conditions. Preferred solvents include all aromatic and/or chlorinated solvents, as well as ketones and cyclic ethers. Toluene, benzene, chlorobenzene, chloroform, methylene chloride, methyl ethyl ketone, tetrahydrofuran or mixtures of these solvents are preferred.

The dissolved unpurified elastomer is subjected to ultrafiltration. In the method according to the present invention, the ultrafiltration is used in order to separate impurities from solutions in the presence of the dissolved elastomers. To this end, the elastomer contained in the solution, as well as the impurities, are passed one or more times under pressure over a semipermeable membrane, which lets through the solvent or the solvent mixture, as well as the homogeneously dissolved impurities contained in it (permeate), but holds back the dissolved elastomer (retentate). In this way, the permeate is collected separately from the retentate.

The pressures which are applied in the present invention lie in the range of from 1 to 80 bar, preferably from 2 to 50 bar. The separated filtrate (permeate) contains the impurity or impurities, and may be replaced by fresh solvent or solvent mixture if the intention is to avoid concentrating the elastomer solution to be extracted (retentate). An advantage with this method is that the residual concentration of the impurities in the purified elastomer can be adjusted in any desired way through the amount of solvent replaced.

As the membranes, it is possible to use all semipermeable and durable membranes which are known to the person skilled in the art for use in ultrafiltration. Ultrafiltration membranes which have a highly porous outer layer (support layer) and further more finely porous inner layers (separating layer) are preferred. The highly porous outer layer may be a fabric or nonwoven or a ceramic substructure. The term "highly porous" is intended to mean an average pore diameter of the outer layer in the range of more than 500 nm. The inner layers are symmetric or asymmetric membranes of suitable polymers applied to the outer layers, or a further more finely porous ceramic layer. The inner layer layers are more finely porous than their respective outer layer. The pore diameters of the inner layers may also become continuously smaller from the outside inwards. The average pore size of the inner layers, or of at least one inner layer, lies in the range of from 1 nm to 200 nm, preferably in the range of from 1 to 50 nm. The exclusion limit of such a membrane being used, which contains outer and inner layers, therefore also lies in the range of from 1 nm to 200 nm. The membrane may furthermore have a thin range from 1 to 50 nm. The membrane may furthermore have a thin separating layer on the surface, which optionally contains ionic groups.

Suitable membrane polymers for both the outer layer and the inner layer include polysulfones, polyether sulfones, polyamides, polyether ketones, polyureas, polyurethanes, polyvinylidene difluoride, cellulose acetates, cellulose nitrates, polycarbonates, polyacrylonitrile and polyepoxides. Membranes based on oxides, carbonates, carbides and nitrides of the elements aluminum, antimony, barium, beryllium, bismuth, boron, hafnium, cobalt, manganese, magnesium, nickel, silicon, thorium, titanium, tungsten and zirconium, sometimes mixed, are typically used as ceramic components.

The method according to the present invention may be carried out either discontinuously or continuously. A continuous method is preferred. In the continuous method, the membrane modules are operated in a cascade fashion. The operating temperature is at most 150° C., and it preferably lies in the range of from 40 to 130° C. In the method according to the present invention, the flow rate of the retentate past the membrane should preferably not be less than 1 m/sec, since otherwise, if there are high polymer concentrations of more than 3 wt. %, concentration polarization occurs and the permeate flux rate drops. Flow rates in the range of from 2 to 10 m/sec are preferred. An upper limit (increasing concentrations) is placed on the concentration of the elastomer in the solution to be treated by ultrafiltration, made up of elastomer, impurities and solvent or solvent mixture, by the increasing viscosity. This in turn depends on the molecular weight and the monomer composition of the elastomer. In order to reduce the viscosity of the elastomer solution, it is advantageous to heat the polymer solution. The concentration limit of the solution to be separated lies in the range of from 2 to 40 wt. %. Concentration limits in the range of from 5 to 20 wt. % are preferred.

All commercially available types are suitable as membrane modules for the continuous method. Plate modules, coil modules, tube modules, capillary modules and multichannel modules, which may optionally be supported by integrated flow spoilers, are preferred.

The impurity or impurities can thus be removed stepwise by the method according to the present invention, and furthermore different concentrations of impurities in the elastomer solution may be set up.

The elastomer solution purified by the method according to the present invention (retentate) may be marketed directly as such, or may be marketed after the processing methods known to the person skilled in the art, such as degassing and spray drying or coagulation in water with subsequent drying, as a powder, crumbs or in bale form with an impurity level which is up to 99 wt. % less than the impurity level in relation to the unpurified elastomer. Other drying methods such as boiling down, film evaporation or freeze drying are also possible.

According to the present invention, an elastomer solution hydrogenated in the presence of a transition metal catalyst can have the transition metal catalyst and/or components thereof removed from it by ultrafiltration. The transition metal catalysts used for hydrogenation often contain expensive transition metals as well as expensive ligands. Leaving the transition metal catalyst and/or components thereof in the hydrogenated elastomer may also greatly impair the properties of the final elastomer. Great efforts are therefore made in order to recover the transition metal catalyst and/or components thereof as much as possible, in an active and/or inactive form.

One method known in the prior art for the separation of homogeneous catalysts containing metal from homogeneous-catalysis processing solutions, is to use adsorbents such as activated carbon, silica gel, aluminum oxide or ion exchange resins carrying functional groups. Recovery of the metals from these adsorption materials often entails elaborate extraction methods or even incineration of the adsorption materials. Besides sometimes considerable losses of metal owing to lack of selectivity and/or efficacy/capacity of the adsorption materials, the recovered metals are then generally stripped of their ligands and therefore of their catalytic activity, in most cases fully. In such cases, it is not therefore possible to reuse the metals in the form of transition metal catalysts without cost-intensive processing. Furthermore, recovery of the metals from ion exchangers by incineration leads to yet further costs, since the adsorption materials of the ion exchangers also constitute a considerable cost factor (EP-A 1203777). The expensive ligands sometimes contained in transition metal catalysts cannot be recovered at all in this way.

The transition metal catalyst or components thereof can hence be recovered from the permeate by the method according to the present invention. Accordingly, the solvent may be removed by distillation and/or drying from the permeate, which contains the transition metal catalyst and/or components thereof, so that up to 99 wt. % of the transition metal catalyst and/or components thereof can be recovered. Other methods for processing an elastomer solution which are known to the person skilled in the art, such as precipitation, filtration and crystallization, may also be used in order to recover the transition metal catalyst and/or components thereof.

According to the method of the present invention, an elastomer which has been dissolved in an organic solvent and from which impurities, selected from the group consisting of emulsifiers, organic and/or inorganic salts or acids such as fatty acids and resins, water, stabilizers, unreacted initiator residues and/or decomposition products, molecular weight regulators, monomers, processing agents such as flocculants and oligomeric components with a molecular weight of less than 2000 g/mol, have been removed by the method according to the invention, may already be hydrogenated with a transition metal catalyst in a further step. Therefore, the method according to the present invention may also be applied to this hydrogenated elastomer solution which is contaminated with transition metal catalyst and/or components thereof. It is not only possible to prepare purified, hydrogenated elastomers in this case, but also to recover the cost-intensive transition metal catalyst.

By the term "unpurified elastomers" in the method according to the invention, the person skilled in the art is intended to understand all elastomers which can be prepared by emulsion polymerization and optionally subsequent hydrogenations, oxidations or reductions. Elastomers which are more than 90% soluble at a concentration of more than 2 wt. % in organic solvents and/or solvent mixtures are particularly preferred. Unpurified elastomers whose glass transition point is below 0° C. are most preferred. Unpurified elastomers selected from the group consisting of nitrile butadiene rubber and hydrogenated nitrile butadiene rubber are preferred. The term "nitrile butadiene rubber" is intended to mean both the copolymer of acrylonitrile and butadiene (NBR) and also copolymers of acrylonitrile, butadiene and further unsaturated monomers selected from the group consisting of vinyl monomers, acrylates, methacrylates, acrylic acid, methacrylic acid, ethylene glycol diacrylate, ethylene glycol dimethacrylate, styrene, divinyl benzene and diene monomers such as isoprene, chloroprene. Preferred further unsaturated monomers are vinyl benzenes such as styrene and divinyl benzene, as well as acrylates such as methyl acrylate, ethyl acrylate, butyl acrylate, 2-ethylhexyl acrylate and methacrylates such as methyl methacrylate, ethyl methacrylate, butyl methacrylate, 2-ethylhexyl methacrylate, methacrylonitrile and free acids such as acrylic acid, methacrylic acid, fumaric acid, itaconic acid, and also maleic anhydride. Nitrile butadiene rubbers which furthermore contain repeat units derived from comonomers with carboxylic groups, are referred to as carboxylated nitrile butadiene rubbers (XNBR).

The term "hydrogenated nitrile butadiene rubbers" is intended to mean all nitrile butadiene rubbers which have been subjected to hydrogenation. Hydrogenated nitrile butadiene rubber which, besides repeat units derived from acrylonitrile and butadiene, does not contain any other repeat units of further unsaturated monomers is referred to as HNBR, whereas all hydrogenated nitrile butadiene rubbers which, besides repeat units derived from acrylonitrile and butadiene, also contain repeat units derived from comonomers with carboxylic groups, are referred to as hydrogenated carboxylated nitrile butadiene rubbers (HXNBR).

The term "purified elastomers" is intended to mean the same groups of elastomers as for "unpurified elastomers", the purified elastomers having an impurity level reduced by up to 99 wt. % in comparison with the unpurified elastomers. Not only are the unpurified elastomers used in a dissolved form in the method according to the invention, but also the purified elastomers are obtained in a dissolved form by the method according to the invention.

A according to the present invention, an unpurified nitrile butadiene rubber can be used, the nitrile group content of which is in the range of from 10 to 60 wt. %, preferably from 15 to 55 wt. %, expressed in terms of the total proportion of the unpurified nitrile butadiene rubber. In the particular embodiment, the unpurified nitrile butadiene rubber contains from 70 to 99.9 wt. %, preferably from 90 to 99.5 wt. % of repeat units derived from acrylonitrile, butadiene and/or further unsaturated monomers which can be copolymerized with these two monomers.

For hydrogenation of the elastomers, a nitrile butadiene rubber obtained from emulsion polymerization is converted into a solid rubber. The conversion of the nitrile butadiene rubber latex into a solid rubber is carried out by the methods known to the person skilled in the art. Some of the impurities are then removed from the solid rubber, either in the manner known to the person skilled in the art or by dissolving in an organic solvent and subsequent ultrafiltration by the method according to the present invention, a reduction of the impurity level by up to 99 wt. % of the previously existing impurity level being achievable only by the method according to the invention. The nitrile butadiene rubber, from which impurities have been removed, is subsequently either dissolved in an organic solvent, if the impurities were removed from it by the purification methods known to the person skilled in the art, such as precipitation or coagulation and subsequent washing, or the retentate solution obtained by the method according to the present invention, which contains the dissolved and purified nitrile butadiene rubber, directly has a transition metal catalyst suitable for the hydrogenation added to it, and is hydrogenated.

Transition metal catalysts suitable for the hydrogenation are all transition metal catalysts known to the person skilled in the art, which are soluble in the organic solvent and can be used for hydrogenation. The nitride butadiene rubber solution, to which the transition metal catalyst is added, is subsequently hydrogenated using the methods known to the person skilled in the art and transition metal catalysts, as described in WO-A 0177185, German disclosure (1987) page 5 by Fiedler, Budrig, Barden and Thoermer, DE-A 3514403. The hydrogenated solution obtained by this method, which is contaminated with transition metal catalyst and/or components thereof, is subsequently subjected to the method according to the invention for purification and recovery of the transition metal catalyst.

By the method according to the present invention, up to 99 wt. % of impurities can be removed or elastomers adjusted to particular impurity levels can be produced. The elastomers obtained by the method according to the invention are distinguished by many advantages. They exhibit less mould contamination in injection-molding applications, and the purified elastomers may be used in contact with food and in the medical field owing to the low incidence of contamination. The purified elastomers can be used for insulation in the electronics field, since only reduced amounts of ionic impurities which can conduct current remain, and environmentally unfriendly substances are not left behind in the event of burning. Owing to these properties, because of the low impurity level, these elastomers are suitable for use in the cosmetic and medical fields, the food-contact and electronics sectors and in the rubber industry. Additional advantages result from the cost saving in subsequent refining processes, for example hydrogenation and metatheses, by saving on catalyst and lower maintenance costs owing to lower corrosion potentials. The method is furthermore straightforward, and it can readily be carried out fully continuously even on an industrial scale.

In a straightforward and economical way, the method according to the present invention makes it possible to recover expensive transition metal catalysts in an active and/or inactive form and/or components thereof from elastomer solutions, besides all the other low-molecular components of the solution. When the described method is used, costly adsorption methods may be substantially obviated or the capacity of existing adsorption systems may be reduced considerably, so that the service lives of the adsorption systems are significantly extended. The method according to the present can furthermore be carried out fully continuously even on an industrial scale.

The separation of the transition metal catalysts or other impurities from elastomer solutions with the aid of ultrafiltration was unexpected because of the high viscosity of the elastomer solutions. Blocking of the pores by cover layer formation or fouling (accumulations at the pore surface) as the filtration time progresses, or adsorptive retention of the transition metal catalysts and/or components thereof or other impurities on the polar membrane surface, which the person skilled in the art might have expected and as is described in the Journal of Membrane Science (2003), 214(2), pages 211–221 by Reddy, Mohan, Bhattacharya Shah and Ghosh or in the Journal of Membrane Science (1999), 160(1), pages 65–75 by Lindau and Jonsson and in CHEMTECH (1996), 26(6), pages 46–53 by Singh Rajindar and in the Journal of Membrane Science (1995), 98(3), pages 249–262 by Nystroem, Kaipia and Luque, is not observed in the method according to the invention. On the surface of the pores in equilibration with the flow rate and viscosity, a solvent-depleted cover layer is formed which strongly controls the filtration rate, but which thereby also permits the use of more highly porous membranes and, at the same time, prevents or reduces wear of the membranes, without significantly reducing the efficiency of the method according to the present invention.

The invention is further illustrated but is not intended to be limited by the following examples in which all parts and percentages are by weight unless otherwise specified.

EXAMPLES

Example 1

The purification of the exemplary NBR polymer solutions (based on a 10 wt. % strength solution of Perbunan® VPKA 8840 (emulsion polymerization product of acrylonitrile and butadiene with an acrylonitrile content of 34 wt. % and a Mooney viscosity of 34 ML 1+4 at 100° C.) in chlorobenzene with an impurity level of 1 wt. % expressed in terms of the Perbunan) was carried out batch-wise by ultrafiltration. The retentate was pumped in a circuit under pressure through a membrane module. The intended amount of permeate was separated and replaced by an equally large amount of the corresponding solvent (chlorobenzene), which was continuously added to the retentate. The effect achieved by this was that the concentration of the polymer solution being used did not change during the purification process. The depletion of a low-molecular contaminant was determined under these conditions by its retention and the solvent exchange coefficient (quantity ratio of permeate to retentate).

Purification of a 10 wt. % strength NBR solution (Perbunan® VPKA 8840 (emulsion polymerization product of acrylonitrile and butadiene with an acrylonitrile content of 34 wt. % and a Mooney viscosity of 34 ML 1+4 at 100° C.)), prepared by emulsion polymerization, used as rubber bales, dissolved in chlorobenzene.

Experimental Conditions:
Module: 2 modules, each with 3 membranes arranged in parallel in the module
Membrane: 6 multichannel elements with 0.066 m² membrane surface area, total surface area 0.396 m²
Separation limit=10 nm
Temperature: 110° C.
Feed pressure in front of membrane: 9 bar
Differential pressure: 3 bar
Flow rate: 4.5 m/s
Permeate flux: 31 kg/m²h
Procedure: diafiltration with chlorobenzene.
Result:

| | Sample 1 | Sample 2 | Sample 3 | Sample 4 | Sample 5 | Sample 6 | Sample 7 |
|---|---|---|---|---|---|---|---|
| Diafiltration coefficient | 0* | 0.12 | 0.73 | 1.52 | 2.29 | 2.76 | 3.12 |
| Total fatty acids [wt. %] | 0.11 | 0.10 | 0.06 | 0.04 | 0.03 | 0.02 | <0.01 |

*Start sample

Example 2

The purification of the exemplary hydrogenated nitrile butadiene rubber elastomer solutions (based on a 10 wt. % strength solution of Therban®C 3467 (hydrogenated emulsion polymerization product of acrylonitrile and butadiene with an acrylonitrile content of 34 and a Mooney viscosity of 68 ML 1+4 at 100° C.) in chlorobenzene) was carried out batch-wise by ultrafiltration. The retentate was pumped in a circuit under pressure through a membrane module. The intended amount of permeate was separated and replaced by an equally large amount of the corresponding solvent (chlorobenzene), which was continuously added to the retentate. The effect achieved by this is that the concentration of the elastomer solution being used did not change during the purification process. The depletion of the catalyst RhCl[P(C$_6$H$_5$)$_3$]$_3$, which was used industrially for the hydrogenation of nitrile butadiene rubber, was determined under these conditions by its retention and the solvent exchange coefficient (quantity ratio of permeate to retentate).

Extraction of the catalyst from a 7.5% hydrogenated nitrile butadiene rubber (based on Therban®C 3467 (hydrogenated emulsion polymerization product of acrylonitrile and butadiene with an acrylonitrile content of 34 and a Mooney viscosity of 68 ML 1+4 at 100° C.)) in chlorobenzene.

Experimental conditions:
Module: 2 modules, each with 3 membranes arranged in parallel in the module
Membrane: 6 multichannel elements with 0.066 m² membrane surface area, total surface area 0.396 m²
Separation limit=10 nm
Temperature: 110° C.
Feed pressure in front of membrane: 5 bar
Differential pressure: 2.2 bar
Flow rate: 4.5 m/s
Permeate flux: 30 kg/m²h
Procedure: diafiltration with chlorobenzene.

RESULT

| | HNBR solution before ultrafiltration | HNBR solution after ultrafiltration |
|---|---|---|
| Diafiltration coefficient | 0* | 2.7 |
| Phosphorus concentration [mg/kg] | 1300 | 120 |
| Total fatty acids [wt. %] | 0.12 | <0.01 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method for the preparation of purified elastomers comprising the steps of
    a) ultrafiltering an unpurified elastomer, prepared by emulsion polymerization, in the presence of an organic solvent and separately collecting the permeate containing the impurities, from the retentate containing the purified elastomer, and
    b) adjusting the flow rate of the retentate to a value of more than 1 m/sec during the ultrafiltration,
    wherein the elastomer is prepared by emulsion polymerization, and
    wherein the level of impurity is reduced in the elastomer by up to 99 wt. % based on the weight of the unpurified elastomer.

2. The method according to claim 1, wherein the unpurified elastomer is nitrile butadiene rubber, prepared by emulsion polymerization and converted into a solid rubber and subsequently dissolved in an organic solvent.

3. The method according to claim 1, wherein the unpurified elastomer is hydrogenated nitrile butadiene rubber prepared by hydrogenation of nitrile butadiene rubber having an impurity level in the range of from 1 to 10 wt. % in the presence of a transition metal catalyst, and wherein the transition metal catalyst is recovered from the permeate of the ultrafiltration and reused in the hydrogenation after processing.

4. The method according to claim 2, wherein a nitrile butadiene rubber is hydrogenated in the presence of a transition metal catalyst to form the unpurified hydrogenated nitrile butadiene rubber and wherein the unpurified hydrogenated solution is ultrafiltered, and the permeate containing the transition metal catalyst is collected separately from the retentate containing the purified hydrogenated nitrile butadiene rubber, and wherein the flow rate of the retentate is adjusted to a value of more than 1 m/sec during the ultrafiltration and the transition metal catalyst being recovered from the permeate of the ultrafiltration and reused in the hydrogenation after processing.

5. The method according to claim 1, wherein the ultrafiltration is performed continuously.

6. The method according to claim 1, wherein the ultrafiltration is carried out at temperatures in the range of from 20° C. to 150° C. and at a pressure in the range of from 1 to 80 bar.

7. The method according to claim 1, wherein the ultrafiltration is carried out with a membrane having an exclusion limit of less than 200 nm.

8. A purified elastomer obtained by the method according to claim 1 which is purified from impurities which are soluble in organic solvents including monomers, additives and all reaction products thereof which may be unreacted added and/or produced during the preparation of the elastomer.

9. A product prepared by processing the purified elastomer according to claim 8.

* * * * *